Dec. 26, 1967 H. FREI 3,360,039
DAMPING DEVICE FOR HEAT EXCHANGERS
Filed March 2, 1966 2 Sheets-Sheet 1
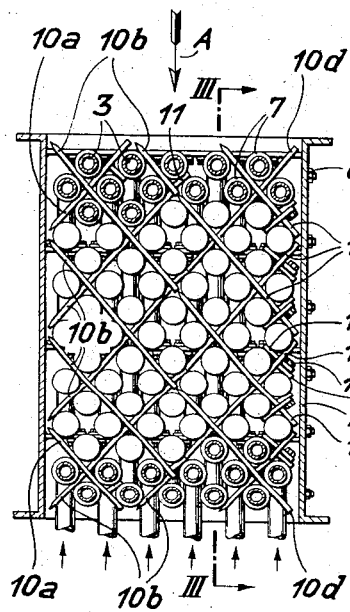
Fig.1
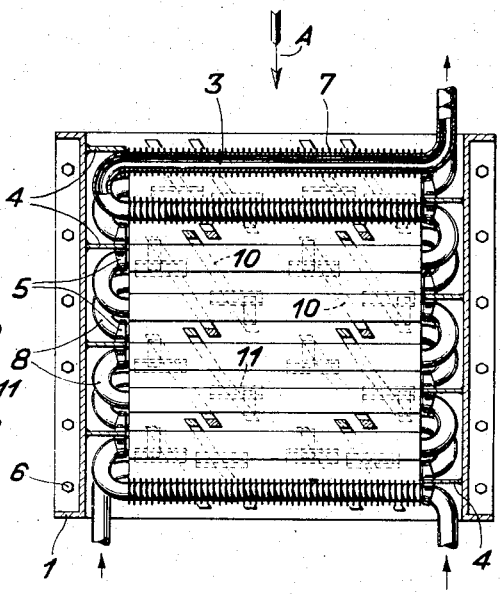
Fig.3
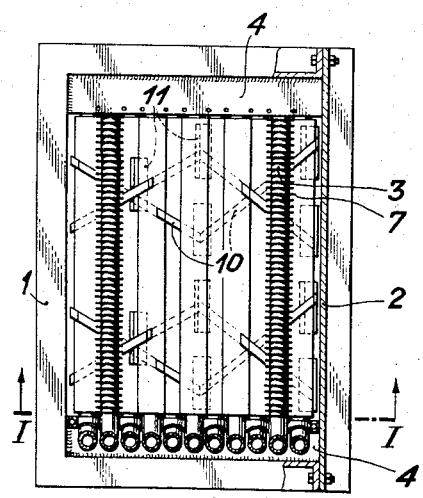
Fig.2
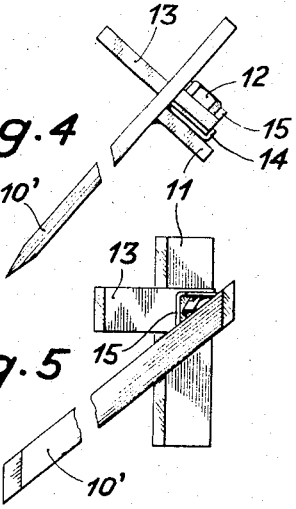
Fig.4
Fig.5
Inventor:
HANS FREI
BY Kenyon & Kenyon
ATTORNEYS Dec. 26, 1967   H. FREI   3,360,039
DAMPING DEVICE FOR HEAT EXCHANGERS
Filed March 2, 1966   2 Sheets-Sheet 2

Inventor:
HANS FREI
BY
Kenyon & Kenyon
ATTORNEYS

United States Patent Office 3,360,039
Patented Dec. 26, 1967

3,360,039
DAMPING DEVICE FOR HEAT EXCHANGERS
Hans Frei, Frauenfeld, Thurgau, Switzerland, assignor to Sulzer Brothers, Limited, Winterthur, Switzerland, a corporation of Switzerland
Filed Mar. 2, 1966, Ser. No. 531,178
13 Claims. (Cl. 165—172)

This invention relates to a damping device for heat exchangers. More particularly, this invention relates to a damping device for heat exchangers having a plurality of parallel rows of fluid-conveying tubes supported at the ends thereof and defining transverse channels therebetween.

Generally, the heat exchangers for cooling a flow of a gas or a liquid medium have been constructed with a plurality of rows of heat-absorbing fluid-conveying tubes arranged in vertical and horizontal alignments so as to form a plurality of transverse channels between the tubes. In addition, the tubes have been supported at their ends within the heat exchanger. However, since the medium flowing over the tubes has been directed in a transverse direction with respect to the tubes, the tubes have become subjected to transverse vibrations between their points of support. Because of these vibrations, the tubes have been placed under increased loadings and in several cases have ruptured.

In order to avoid any destruction of the tubes by vibrational stresses, vibration damper rods have been inserted between the tubes so that the tubes could slide thereon during vibration to dissipate some of the vibration energy by converting it to frictional heat.

However, the damper rods have been inserted to be disposed in one or more planes at right angles to the axial direction of the tubes. Because of this, the tubes have contacted the rods at points having substantially the same state of vibration so as to cause the tubes and rods to act as a unit under vibrational loads, without effectively damping the vibrations. To overcome the effect, the damper rods have been secured to the casing of the heat exchanger; however, this is undesirable as it has entailed considerable expense and time, especially on assembly and in the event of repairs.

Still other attempts have been made to overcome the problem of transverse vibrations. One of these has used damper rods having cores of resilient material protected from damage by hard jackets. These rods have been inserted into the channels between the heat exchanger tubes with the ends of the resilient cores projecting out of the jackets so that they can slide either along the walls of the heat exchanger or along special rail-like strips on the walls. However, these rods have not been able to damp all the vibrations and have thus transmitted some of the vibrations to the heat exchanger walls. Because of this, these resilient core rods have been objectionable. In addition, the resilient core rods have been expensive to fabricate and have been limited to use in a mean temperature range because the resilient material has not been able to withstand excessively high or low temperatures without losing its resilience or becoming otherwise destroyed.

Accordingly, it is an object of this invention to provide a damping device for heat exchangers which is not secured to the heat exchanger.

It is another object of this invention to provide a damping device for heat exchangers which contacts the tubes of the heat exchanger at respective points having different states of vibration.

It is another object of this invention to provide a damping device for the tubes of a heat exchanger which contacts each tube at a different point relative to the support of each tube.

It is another object of this invention to provide a damping device for the tubes of a heat exchanger which can be fixed in place without securement to the casing of the heat exchanger.

Generally, this invention provides a damping device comprising a damping bar which is sized to fit within the transverse channels formed by the plurality of nested tubes of a heat exchanger in angular relationship with respect to the axial planes of the tubes to contact a number of these tubes.

Because the damping device contacts a plurality of tubes at points of different states of vibration, the damping device and tubes do not vibrate as a unit. Further, since forces having different magnitudes and directions are imposed on the damping device by the tubes, the damping device remains in substantially the same position in space without regard to the type of securement used.

In order to insure against displacement and turning, the damping bar is provided with a flattened leg of rectangular cross-section which projects perpendicularly from the damping bar at an inclined angle so that it can be inserted between a pair of tubes in the heat exchanger parallel to their longitudinal axis. In addition, where the flattened leg cannot be clamped between two tubes, a latching means is releasably secured to the flattened leg for insertion between a pair of tubes of a pair of exterior tube panels to secure the damping bar against longitudinal displacement.

Since the limiting amplitude of a vibration is dependent on the permissible stress in a tube at its support during vibration, the ratio of the amplitude to the permissible stress increasing with the resiliency of the support connection, it is advantageous to increase the path on which an amplitude of vibration travels so as to effect an increased damping effect as the tubes slide on the damping device. Thus, the straight tubes of the heat exchanger are supported at one end while the other ends of the tubes are secured to pipe bends, the planes of which are situated in the direction of flow of a medium around the tubes.

These, and other objects and advantages, will become more apparent from the following detailed description taken in conjunction with the accompanying drawings in which:

FIG. 1 illustrates a cross-sectional view taken on line I—I of FIG. 2;

FIG. 2 illustrates a plan view of a heat exchanger damped according to the invention;

FIG. 3 illustrates a view taken on line III—III of FIG. 1;

FIG. 4 illustrates a front view of a damping device of the invention;

FIG. 5 illustrates a plan view of the damping device of FIG. 4;

Figure 6:
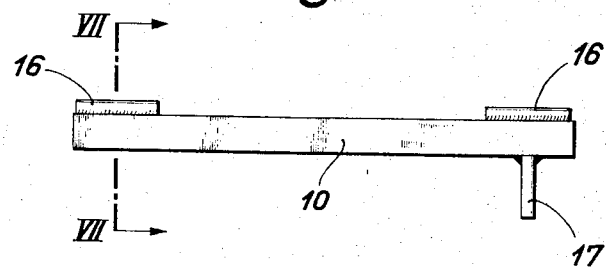
FIG. 6 illustrates another embodiment of a damping device of the invention.

Referring to FIGS. 1 to 3, the general construction of a heat exchanger to which the damping device of the invention can be applied includes an open-ended flow duct 1 of rectangular construction, which is adapted for installation in the reactor plant of a gas-cooled nuclear reactor. The flow duct 1 houses a plurality of tubes 3 through which a steam or vapor medium flows to absorb the heat of the reactor gas coolant, e.g., $CO_2$, which flows through the duct 1 transversely over the surfaces of the tubes 3 in the direction indicated by arrow A in FIGS. 1 and 3. In some instances, a plurality of flow ducts are disposed in side by side relationship in a pressure vessel of a reactor plant.

As an example of the size of a heat exchanger of the above type, a flow duct may measure 2 x 2 x 10 meters and be of a weight in excess of 100 metric tons.

One of the walls 2 of the duct 1 is detachably secured thereto, as by bolts 6 to two oppositely fixed walls, in order to permit the proper installation of the tubes 3. The tubes 3 are formed in panels having a plurality of straight parallel portions encircled by circular fins 7 and interconnected by non-finned bends 8. When installed in the duct 1, the tube panels are disposed vertically side by side in a staggered relationship and secured alternately top and bottom to brackets 4 on the duct walls adjacent removable wall 2, the brackets being staggered with respect to one another on the two walls. The division of the tubes 3 into plane parallel panels results in the formation of diagonally direction channels through which vibration damping devices 10 are inserted.

The damping devices are comprised of bars 10 of angular cross-section which are disposed in the channels between the straight portions of the tubes at angles to each other to contact the tubes at at least two points in different states of vibration. The bars 10 have transverse dimensions slightly larger than the channels so that they become slightly clamped and stabilized between the fins 7 and maintained thereby in the event of vibration, at least for some of the vibrational movement. Thus, a considerable part of the vibration energy is converted into heat by the friction between the bars 10 and tubes 3. In addition, the bars 10 are pointed at one end to facilitate insertion into the channels.

Referring to FIGS. 4 and 5, in order to prevent displacement or turning of the damping bar 10 after it has been inserted between the tubes 3, a flattened leg 11 is secured to one side of the damping bar 10 on an inclined plane perpendicular to the plane of the damping bar 10. When in place, the leg 11 is inserted and clamped between a pair of tubes in a channel, which is perpendicular to the channel which receives the damping rod 10. Further, the leg 11 is orientated within the respective channel so that its longitudinal axis is parallel to the axis of the pair of tubes which serve to clamp it in place.

In the event that a leg 11 cannot be clamped between a pair of tubes, as in the case of damping bar 10′ (FIG. 1), a latching means, such as, a leg 13, is releasably secured, as by bolts 12, to the leg 11. The leg 13 is disposed in a plane parallel to the plane of leg 11; however, the leg 13 is adapted to be directed in the opposite direction from the leg 11 relative to the damping bar 10′ so that it can be inserted between a pair of tubes 3, as shown in FIG. 1, to prevent longitudinal displacement of the bar 10′. In order to prevent turning of the leg 13 relative to leg 11, a suitable means, such as a Z-shaped plate 14, is provided between the legs 11, 13. Also, a suitable locking plate 15 is positioned in cooperation with the bolt 12 to prevent accidental loosening thereof.

Figure 7:
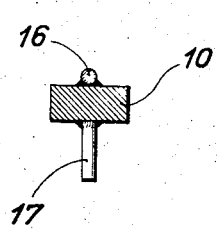
FIG. 7 illustrates a view taken on line VII—VII of FIG. 6.

Referring to FIGS. 6 and 7, a damping bar 10 of modified construction is formed of a rectangular cross-section and provided with a locking element 16 of circular cross-section at each end and a retainer leg element 17 of circular cross-section. The locking elements 16 are welded to the same transverse surface of the bar 10 so that the axis of each element 16 is parallel to the axis of the bar 10 and the retainer leg element 17 is welded to the opposite transverse surfaces of the bar so that the axis of the element 17 is perpendicular to the axis of the bar. When in place, the locking elements 16 fit between the fins 7 of the tubes 3 and the retainer 17 retains the bar 10 against longitudinal displacement.

Alternatively, one of the ends of the bar 10 can be extended beyond the locking element 16 and bent at an angle. Further, the bar 10 can be formed of a triangular cross-section with the locking elements 16 being omitted. Also, the bars can be hollow, as well as solid.

The material used to form the damping bars depends upon the intended use for the heat exchanger, as well as the temperatures to which the heat exchanger is to be subjected. For example, for high temperatures, the bars are of metal, such as, iron or metal alloy, whereas for low temperatures, the bars are of plastic material.

In order to assemble the heat exchanger, the side wall 2 is first removed and the panels are successively introduced into the flow duct 1 and secured to the brackets 4 by the flanges 5. After three tube panels are installed, damping bars 10a are inserted between the channel formed by the tube panels. Thereafter, three more tube panels are installed and damping bars 10 are inserted. Then, the next four tube panels are installed and damping bars 10d are inserted in the formed channels. Thereafter, the last tube panel is installed to secure the bars 10d in place and the bars 10′ are inserted. Finally, the latching means 13 are fitted into the respective channels and secured to the legs 11 of the bars 10′. The side wall 2 is then put back in place on the flow duct 1 by the bolts 6, and, if warranted, can be welded to the adjacent walls.

It is noted that the tube panels can be arranged in horizontal alignment with each other instead of in a staggered relation. Also, it is noted that the tubes need not be provided with fins to secure the damping devices in place.

Having thus described the invention, it is not intended that it be so limited as changes can be readily made therein without departing from the spirit of the invention. Accordingly, it is intended that the subject matter described above and shown in the drawings be interpreted as illustrative, and not in a limiting sense.

What is claimed is:

1. A damping device for insertion between the tubes of a heat exchanger comprising a damping bar sized to fit between the tubes of a heat exchanger in clamping engagement therewith, and a first leg of rectangular cross-section secured to said damping bar, said leg projecting perpendicularly from said damping bar at an inclined angle thereto for insertion between a pair of tubes of the heat exchanger to maintain said damping bar against longitudinal displacement.

2. A damping device as set forth in claim 1 which further comprises a latching means releasably secured to said leg for insertion between a pair of tubes in a pair of exterior tube panels.

3. A damping device as set forth in claim 2 wherein said latching means includes a second leg of rectangular cross-section disposed in a plane parallel to the plane of said first leg, said second leg projecting with respect to said damping bar in a direction opposite to the direction of projection of said first leg, and means for releasably securing said second leg to said first leg.

4. A damping device as set forth in claim 3 which further includes a Z-shaped element positioned between said first and second legs for preventing relative turning therebetween.

5. A damping device for insertion between the tubes of a heat exchanger comprising a damping bar of rectangular cross-section, a pair of locking elements, each of said locking elements being of circular cross-section and being secured to a first transverse surface of said damping bar at a respective end thereof, and a retainer leg element of circular cross-section secured to a second transverse surface opposite said first transverse surface, said retainer leg element projecting perpendicularly from said damping bar for insertion between a pair of tubes of the heat exchanger to maintain said damping bar against longitudinal displacement.

6. In combination with a heat exchanger having a flow duct and a plurality of tubes disposed in said flow duct transverse to the flow of a heat medium through said flow duct, said tubes forming a plurality of channels therebetween, at least one damping device positioned in one of said channels, said damping device comprising a damping bar disposed at an acute angle with respect to the axes of said tubes to contact a plurality of tubes at points having different states of vibration whereby said damping device damps the transverse vibrations of said tubes caused by the flow of a heated medium over said tubes.

7. In the combination as set forth in claim 6, said damping device further comprising a first leg secured to said damping bar, said leg projecting perpendicularly from said damping bar and being disposed between a pair of tubes in another of said channels transverse to said one of said channels for retaining said damping bar against longitudinal displacement.

8. In the combination as set forth in claim 7, wherein said first leg is of rectangular cross-section and projects on an inclined plane perpendicular to said damping bar.

9. In the combination as set forth in claim 7, wherein said first leg is of circular cross-section.

10. In the combination as set forth in claim 7, said damping device further comprising a second leg of rectangular cross-section disposed in a plane parallel to said first leg and projecting in an opposite direction from the direction of said first leg with respect to said damping bar, said second leg being disposed in a channel between a second pair of tubes in a second channel transverse to said one of said channels and having the longitudinal axis thereof disposed in parallel relation to the axis of said second pair of tubes, and a releasable securing means securing said second leg to said first leg.

11. In the combination as set forth in claim 6 wherein each of said tubes includes a straight section having a plurality of fins thereon defining said channels.

12. In the combination as set forth in claim 11 wherein each of said straight portions is supported at one end to said heat exchanger and at the other end to a pipe bend, the axis of which is parallel to the direction of flow of the heated medium.

13. In the combination as set forth in claim 6 wherein each of said damping bars has a pointed end to facilitate insertion in said channels.

References Cited

UNITED STATES PATENTS

| | | | |
|---|---|---|---|
| 2,402,209 | 6/1946 | Ryder | 165—172 X |
| 3,163,208 | 12/1964 | Cuzzone et al. | 165—162 X |
| 3,292,691 | 12/1966 | Welter et al. | 165—172 X |

ROBERT A. O'LEARY, *Primary Examiner.*

A. W. DAVIS, Jr., *Assistant Examiner.*